United States Patent [19]
Takayanagi

[11] Patent Number: 5,177,647
[45] Date of Patent: Jan. 5, 1993

[54] AUTOMATIC TRACKING SYSTEM FOR MAGNETIC RECORDING AND/OR REPRODUCING APPARATUS

[75] Inventor: Nobuharu Takayanagi, Saitama, Japan

[73] Assignee: Sony Corporation, Tokyo, Japan

[21] Appl. No.: 509,351

[22] Filed: Apr. 16, 1990

[30] Foreign Application Priority Data

Apr. 17, 1989 [JP] Japan .................................. 1-96898

[51] Int. Cl.⁵ ...................... G11B 21/04; G11B 15/467
[52] U.S. Cl. .................................... 360/70; 360/77.13; 360/73.08
[58] Field of Search ........................ 360/10.2, 10.3, 70, 360/73.08–73.14, 77.13, 77.16, 77.17

[56] References Cited

U.S. PATENT DOCUMENTS

| | | | |
|---|---|---|---|
| 3,663,763 | 5/1972 | Trost | 360/70 |
| 4,745,496 | 5/1988 | O'Gwynn | 360/70 |

FOREIGN PATENT DOCUMENTS

| | | |
|---|---|---|
| 0103463 | 3/1984 | European Pat. Off. . |
| 0181186 | 5/1986 | European Pat. Off. . |
| 0302696 | 2/1989 | European Pat. Off. ......... 360/77.13 |
| 0307586 | 3/1989 | European Pat. Off. . |
| 2068599A | 8/1981 | United Kingdom . |

*Primary Examiner*—Jerry Smith
*Assistant Examiner*—Steven R. Garland
*Attorney, Agent, or Firm*—Hill, Van Santen, Steadman & Simpson

[57] ABSTRACT

An automatic tracking system for a magnetic recording and/or reproducing apparatus is provided means for varying a phase relationship between a magnetic head and a recording track and for monitoring the level of signals reproduced by a magnetic head at various phase relationships, and means for detecting an optimal point which is centroid of the reproduced signal levels. The automatic tracking system further includes means for controlling a tape feed speed so as to establish the phase relationship of the magnetic head and the recording track, which phase relationship corresponds to an optimal phase relationship.

9 Claims, 7 Drawing Sheets

SCANNING TRACE    RECORDING TRACK

AUTOMATIC TRACKING SYSTEM FOR MAGNETIC RECORDING AND/OR REPRODUCING APPARATUS

BACKGROUND OF THE INVENTION

1. Field of the Invention

The present invention relates recording and/or reproducing apparatus, recorders, pulse-code modulated (PCM) audio signal recorders and so forth. more specifically, the invention relates to an automatic tracking system for a magnetic recording and/or reproducing apparatus, which can satisfactorily control tape feed speed for fine tracking.

2. Description of the Background Art

In modern video tape recorders, automatic tracking systems provide automatic adjustment of tracking volume without requiring manual operation. In a typical automatic tracking system, the speed of a capstan motor is so controlled that a control signal recorded in a control track on a magnetic tape can be maintained in a predetermined phase relationship to a rotary drum. By way of this, the scanning start timing of a magnetic head is controlled to the same timing as a recording to assure reproduction of a well adjusted video image.

The ideal reproduced control signal has a symmetric waveform with respect to a center and peak signal level. Using such an ideally reproduced control signal, the automatic tracking control can be done very efficiently by adjusting the capstan motor speed to obtain the peak level of the control signal, by adjusting the phase relationship between the magnetic head and the control track to obtain the peak level of the control signal, optimal video image reproduction can be achieved.

However, it is not possible to obtain an ideally reproduced control signal due to the tolerances involved in the installation of tape drive systems and rotary heads, which tolerances necessarily cause slight fluctuation of the angle of a scanning trace of the magnetic head, or meandering of the scanning trace. Such tolerance in the scanning trace of the magnetic head versus the magnetic tape will cause distortion of the reproduced control signal. A distorted control signal makes it difficult to detect the optimal phase relationship between the magnetic head and the recording tracks on the magnetic tape.

In a typical case, a practically reproduced control signal has an asymmetric waveform with respect to the peak level of the control signal or has a multi-peak waveform. when a multi-peak waveform control signal is reproduced, a conventional automatic tracking system selects one of the peaks for adjusting the phase relationship between the magnetic head and the tape track. In contrast to this, it has been noted that, through manual adjustment by means of a manually operable tracking volume, improved fine reproduction of the video image can be obtained at a phase relationship intermediate between the points where the peak level of the control signal is obtained. Therefore, conventional automatic tracking systems fail to provide optimal tracking adjustment. Additionally, in a case where an asymmetric waveform control signal is produced, a conventional automatic tracking control system adjusts the phase relationship between the magnetic head and the tape track at a point where the maximum level of the control signal is obtained though such point is offset from the center point where the optimal video image reproduction performance can be obtained. In such case, jitter causes the phase relationship to shift and the reproduced signal level tends to drop rapidly, causing a substantial degradation of the reproduced video image.

SUMMARY OF THE INVENTION

Therefore, it is an object of the present invention to solve the difficulties inherent in prior art systems.

Another object of the present invention is to provide an automatic tracking system for a magnetic recording and/or reproducing apparatus, which automatic tracking system can compensate for the tolerance in a scanning trace of a magnetic head versus a recording track of a magnetic recording medium.

In order to accomplish aforementioned and other objects, an automatic tracking system for a magnetic recording and/or reproducing apparatus, according to the present invention, is provided with means for varying the phase relationship between a magnetic head and a recording track and for monitoring levels of signals reproduced by a magnetic head at various phase relationships, and means for detecting an optimal point which is at the centriod of reproduced signal levels. The automatic tracking system further includes means for controlling a tape feed speed so as to establish a phase relationship of the magnetic head and the recording track, which corresponds to an optimum point.

According to one aspect of the invention, a magnetic reproducing apparatus comprises: a rotary head drum assembly carrying a magnetic head for reproducing information recorded on a recording track of a magnetic recording medium; a drive system for feeding the magnetic recording medium over the rotary head; first means, associated with the drive system, for controlling a feeding speed of the magnetic recording medium for adjusting a phase relationship between the magnetic head and the recording track to a predetermined phase relationship; second means, cooperative with the first means for periodically varying the predetermined phase relationship by a predetermined magnitude so that the phase relationship between the magnetic head and the recording track is periodically shifted; third means for monitoring the level of a signal reproduced by the magnetic head and sampling the signal level at every occurrence of a predetermined sampling timing; and fourth means for processing a predetermined number of the sampled signal levels for deriving a center of integration thereof for setting the predetermined phase relationship to the center of integration.

Preferably, the second means is responsive to the initiation of a reproducing operation for causing variation of the predetermined phase relationship until the predetermined number of the sampled signal levels is obtained by the fourth means. In such case, the second means may vary the predetermined phase relationship within a predetermined range defined by a maximum advance point and a maximum retard point which maximum advance and retard points are determined at points where no substantial variation of the reproduced signal level is caused.

On the other hand, the rotary head drum assembly may carry a plurality of magnetic heads, and the fourth means derives the center of integration of signal levels with respect to each of the magnetic heads for deriving an optimal phase relationship with respect to corresponding magnetic heads and derives the predetermined phase relationship to be set on the basis of the optimal phase relationship derived with respect to each of the magnetic heads. In this case, the fourth means derives the predetermined phase relationship to be set by introducing a weighting factor. The magnetic reproducing apparatus may comprise a video tape recorder. In such case, the video tape recorder may be provided with a rotary head drum assembly including at least one video signal reproducing head and at least one audio signal reproducing head, and the fourth means derives the center of integration of signal levels with respect to each of the magnetic heads for deriving an optimal phase relationship with respect a corresponding magnetic head and derives the predetermined phase relationship to be set on the basis of the optimal phase relationship derived with respect to each of the magnetic heads.

In the latter mentioned case, the magnetic recording medium may comprise a video tape having a video recording track on which an audio signal is additionally recorded by way of deeper phase recording, and the fourth means gives a greater weighting factor to the optimal phase relationship derived with respect to the audio signal reproducing head.

In addition, the third means preferably checks signal level differences with adjacent sampling timings for detecting the quality of sampled signal level data for rejecting the sampled signal level data when the difference is greater than a predetermined threshold value.

BRIEF DESCRIPTION OF THE DRAWINGS

The present invention will be understood more fully from the detailed description of the invention and from the accompanying drawings of the preferred embodiment which, however, should not be taken to limit the present invention to the specific embodiment, but are for explanation and understanding only.

DESCRIPTION OF THE PREFERRED EMBODIMENT

Figure 1:
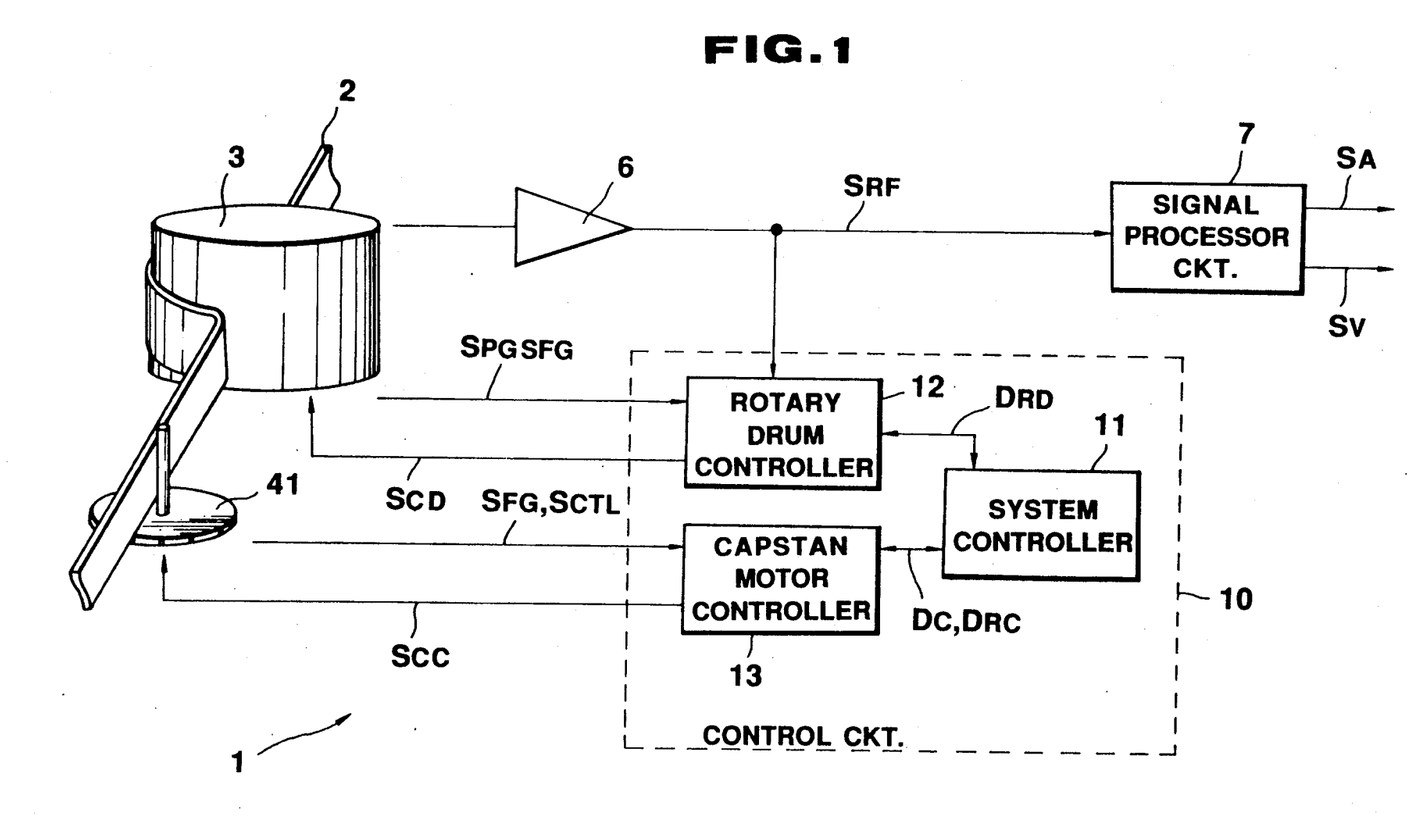
FIG. 1 is a block diagrammatic illustration of the preferred embodiment of an automatic tracking system for a magnetic recording and/or reproducing apparatus, according to the present invention.

Referring now to the drawings, particularly to FIG. 1, there is illustrated a rotary head type magnetic tape recording and/or reproducing apparatus 1, for which the preferred embodiment of an automatic tracking system, according to the present invention, is incorporated. In the shown embodiment, the magnetic tape recording and/or reproducing apparatus comprises a video tape recorder which records and/or reproduces information related to, for example, a video movie, i.e. a video signal and an associated audio signal in combination. Though the following discussion of the preferred embodiment of the automatic tracking system will be concentrated on that incorporated in a video tape recorder, the automatic tracking system of the present invention is applicable to various types of screwed track type or rotary head type information recording, such as that in a PCM audio signal recorder.

In the shown embodiment, the magnetic tape recording and/or reproducing apparatus has a rotary head drum 3, on which a magnetic tape 2 is wrapped. To the magnetic tape 2, a capstan is associated to transmit driving torque from a capstan motor 4 so that the tape can be fed over the rotary head drum 3 at a controlled speed determined by the capstan motor speed. The rotary head drum 3 carries a plurality of magnetic heads for video recording and/or reproduction and audio recording and/or reproduction. When the magnetic recording and/or reproducing apparatus operates for reproduction, a reproduced signal $S_{RF}$ is fed from the magnetic heads to a signal processor circuit 7 via an amplifier 6. The signal processor circuit 7 processes the reproduced signal $S_{RF}$ to output a video signal $S_V$ and an audio signal $S_A$.

A control circuit 10 includes a system controller 11, a rotary drum controller 12 and a capstan motor controller 13. The rotary drum controller 12 and the capstan motor controller 13 are cooperatively controlled by the system controller 11 for adjusting the phase relationship between the magnetic head on the rotary head drum 3 and the recording track o the magnetic tape 2 for fine tracking.

For this, the rotary drum controller 12 receives a reference pulse $S_{FG}$ indicative of a predetermined reference position of the rotary head drum and a position pulse $S_{PG}$ at every predetermined angular displacement of the rotary head drum. Both the reference pulse and the position pulse are output from the rotary head drum for forming a rotary head servo network. The rotary drum controller 12 also receives a switching pulse from the system controller 11. The rotary drum controller 12 processes these reference signals, $S_{FG}$ the position pulse, $S_{PG}$ and the switching pulse, in a per se known manner to control rotational driving of the rotary head drum 3. As is well known, the rotary head network is locked in the desired rotational state of the rotary head drum for establishing a servo locked state for steady driving of the rotary head drum. on the other hand, when the servo locked state is released, the rotary drum controller 12 detects the servo lock released state to output a servo lock released indicative signal $D_{RD}$ to the system controller 11.

Figure 2:
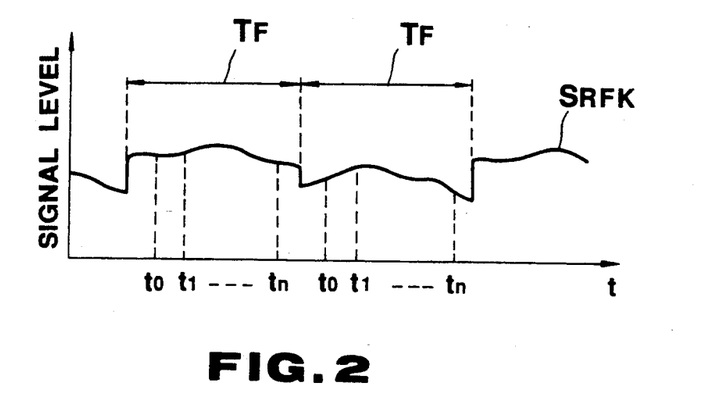
FIG. 2 is chart showing a waveform of a signal produced in the preferred embodiment of the automatic tracking system of FIG. 1.

Furthermore, the rotary drum controller 12 is designed to detect the envelope of the reproduced signal $S_{RF}$ to produce a detected signal $S_{RFK}$ as shown in FIG. 2. The rotary drum controller 12 monitors the signal level of the detected signal $S_{RFK}$ for sampling signal level data at every predetermined sampling timing to, $t_0, t_1 ... t_n$, which sampling timing is determined with respect to the reference signal $S_{FG}$ and the position signal $S_{PG}$. The rotary drum controller 12 transfers the sampled signal level data of each magnetic head for each field $T_F$ to the system controller 11 at a predetermined timing.

The system controller receives the sampled signal level data of each magnetic head and derives a sum value of the sampled level data for each one filed and thus derives an integrated signal level data of each magnetic head. This permits detection of the signal level of the reproduced signal $S_{RF}$ with high precision.

On the other hand, the capstan motor controller 13 is designed for controlling the driving speed of the capstan motor in terms of the reference signal $S_{FG}$ for synchronization of the capstan speed with rotation of the rotary head drum 3. For this, the capstan motor controller 13 receives a capstan control signal $D_C$ from the system controller. The capstan controller 13 thus adjusts the capstan speed so that a predetermined phase relationship between the switching pulse and a control signal $S_{CTL}$ can be established. Therefore, the phase relationship of the control signal $S_{CTL}$ stored in the control track of the magnetic tape thus the magnetic head in the rotary head drum can be maintained at a predetermined phase relationship determined by the capstan control signal DC. Therefore, by varying the capstan control signal DC, the phase relation can be varied.

The capstan motor controller 13 detects the establishment of a phase relationship coincident with that represented by the capstan control signal $D_C$ to output a capstan motor locked state indicative signal $D_{RC}$ to the system controller 11.

Figure 3:
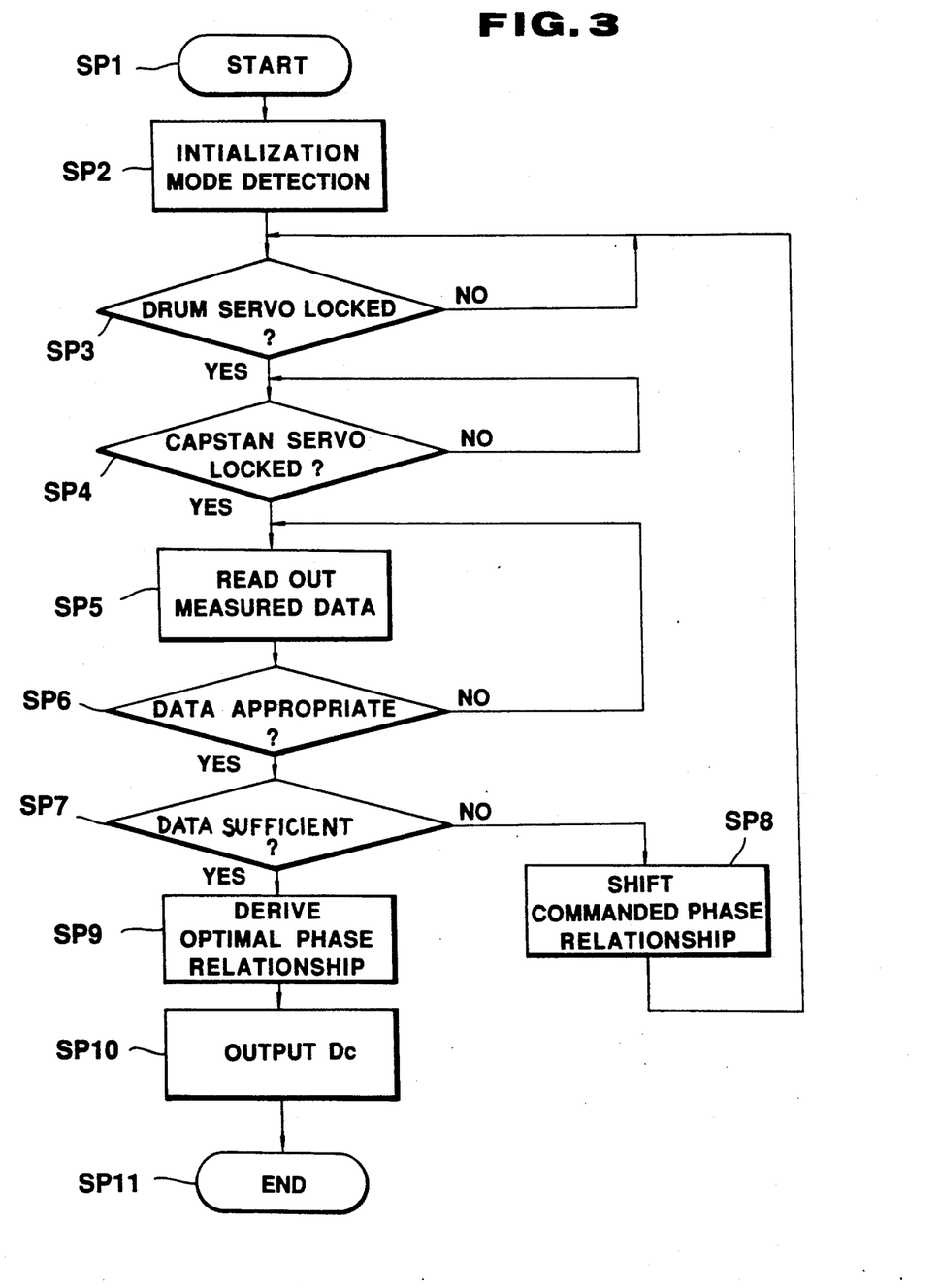
FIG. 3 is a flowchart showing elements of the signal processing to be performed in a system controller in the preferred embodiment of the automatic tracking system of FIG. 1.

The system controller 11 is responsive to the initiation of a reproduction mode operation to perform the process as illustrated in FIG. 3 for detecting an optimal phase relationship between the recorded track on the magnetic tape Lo be reproduced and the magnetic head of the rotary head drum 3.

The system controller 11 enters a mode of operation for determining the optimal phase relationship, as shown in FIG. 3, at a step $SP_1$ immediately after starting the process at the step $SP_1$, initial setting is performed at a step $SP_2$ In the process of the step $SP_2$ control signals are output to the rotary drum controller 12 and the capstan motor controller 13 for initialization of the phase relationship. Initialization of the phase relationship is performed by setting the phase relationship of the magnetic head 3 and the recording track at a position corresponding to a neutral position of a manually operable tracking volume.

In addition, the system controller 11 detects the recording mode of the magnetic tape to be reproduced, at the step $SP_2$. In this process, discrimination is made between Hi-Fi mode recording which records audio signals at a deeper phase recording on a video recording track, and Normal mode recording which records audio signals only on an audio track.

At a step $SP_3$ a check is performed as to whether the rotary drum servo network is locked by checking for the presence of the rotary drum servo lock released state indicative signal $D_{RD}$. As long as the rotary drum servo lock released state indicative signal $D_{RD}$ is present the answer at the step $SP_3$ is negative, and the checking process is repeatedly and cyclically performed, awaiting the establishment of the locked state of the rotary drum servo. In response to termination of the rotary drum servo lock released state indicative signal $D_{RD}$ the process goes to a step $SP_4$. At the step $SP_4$, where a check is performed as to whether the capstan motor servo network is locked or not by checking the rotary drum servo locked state indicative signal $D_{RC}$. At this step SP. the presence of the rotary drum servo locked state indicative signal $D_{RC}$ is checked to determine whether the phase relationship between the magnetic head and the recording track as commanded by the capstan control signal $D_C$ is established or not. Similarly to the step $SP_3$ the process in the step $SP_4$ is repeated until presence of the rotary drum servo locked state indicative signal $D_{RC}$ is detected.

After detecting the presence of the rotary drum servo locked state indicative signal $D_{RC}$ at the step $SP_4$ the sampled signal level data of each magnetic head, sampled over four fields by the rotary drum controller 12, is read out at a step $SP_5$. By this, the signal level of the reproduced signal $S_{RF}$ of the locked state of the rotary drum servo and the capstan motor servo networks can be obtained.

Therefore, at a step $SP_6$ the read out sampled signal level data is analyzed for discriminating whether the data obtained is appropriate for use in determination of the phase relationship between the magnetic head and the recording track on the magnetic tape. Discrimination is practically performed by comparing signal level data at respective time points $t_0, t_1 ... t_n$ of each magnetic head over four fields and by checking whether difference of the signal level over four fields is within a predetermined range. When the difference in the signal level is out of the predetermined range due to signal drop out in reproduction of the recorded information, the process returns to the step SP 5 for obtaining fresh data for four fields. On the other hand. if the difference of the signal level as checked at the step SP 6 is within the predetermined range, a sum value of the signal levels at respective time points $t_0, t_1 ... t_n$ of the reproduced signal $S_{RF}$ reproduced by each magnetic head over four fields is derived at the step $SP_6$. Subsequently, the derived sum values are temporarily stored in a memory. Then, at a step $SP_7$, a check is performed whether the number of sum values stored in the memory is sufficient for derivation of the phase relationship.

As long as the number of the stored sum values in the memory is smaller than a predetermined number which is required for accurately determining the phase relationship, the process goes to a step $SP_8$. At the step $SP_8$, the phase relationship is shifted in an advancing direction for a given magnitude and outputs the capstan control signal $D_C$ for causing variation of the phase relationship between the magnetic head and the recording track on the magnetic tape. By shifting the phase relationship the overlapping magnitude of the scanning trace of the magnetic head of FIG. 4 relative to the recording track of FIG. 4 can be varied as shown in FIG. 5. After commanding shifting of the phase relationship, the process returns to the step $SP_3$. As will be appreciated herefrom, the steps $SP_3$ to SP 8 are repeatedly performed until the number of the stored sum values reaches the predetermined number. During this process, when the phase relationship is advanced to a predetermined maximum advance magnitude, then, the process in the step $SP_8$ is switched to retard the phase relationship for a given magnitude toward a predetermined maximum retarding magnitude. When the number of the stored sum values reaches the predetermined number, process goes to a step $SP_9$ for deriving the phase relationship.

The maximum advance and retard magnitudes define a range of variation in the phase relationship. The variation range is set in a range corresponding to an adjusting range of a manually operable tracking volume without causing substantial degradation of the reproduced video image. Therefore, during the process of determination of the phase relationship, significant degradation of the video image is never caused.

In the process of the step SP9, an optimal phase relationship point $\theta H$ is determined by deriving an integration center according to the following process.

With respect to each magnetic head, the optimal phase relationship point $\theta H$ is derived according to the following equation:

$$\theta_H = \frac{\Sigma k F(k)}{\Sigma k} \quad (1)$$

wherein k is the phase relationship shifted from the neutral or reference phase relationship and F(k) is a sum value obtained at each phase relationship.

The foregoing equation can be expressed as:

$$\theta_H = \frac{1}{2\pi} \int_{-A}^{A} F(\theta) d\theta \quad (2)$$

$$A = \pi$$

Figure 4:
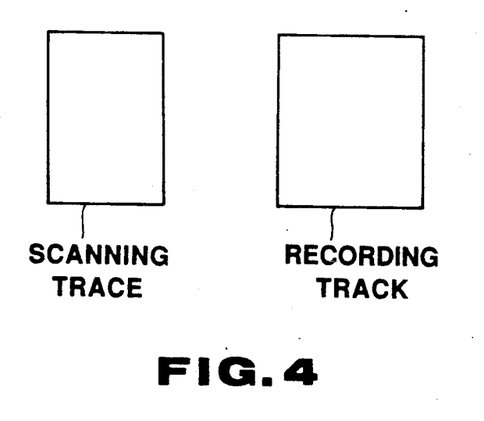
FIGS. 4 and 5 are explanatory illustrations showing a relationship between a scanning trace of a magnetic head and a recording track.
Figure 5:
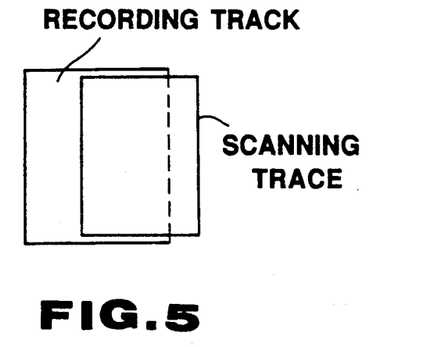
Figure 6:
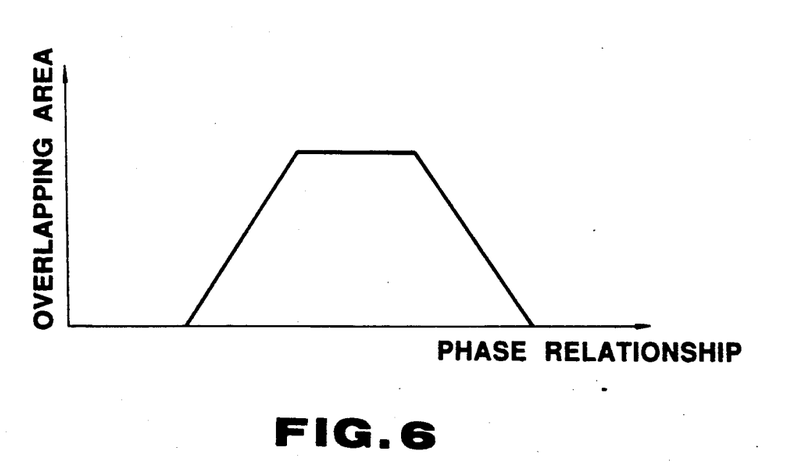
FIG. 6 is a chart showing the relationship between an overlapping area of the scanning trace and the recording track and the phase relationship between the magnetic head and the recording track.
Figure 7:
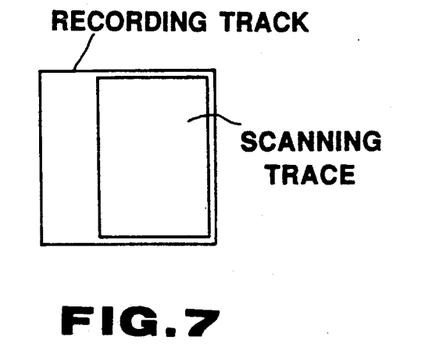
FIGS. 7, 8 and 9 are illustrations showing various overlapping relationships of the scanning trace and the recording track.

In the simplified model in FIGS. 4 and 5, if the scanning trace of the magnetic head is smaller than the recording track, the overlapping area of the recording track and the scanning trace will vary as illustrated in FIG. 6. In general, the signal level of the reproduced signal $S_{RF}$ is variable depending upon the overlap magnitude of the recording track and the trace of the magnetic head. Therefore, as shown in FIG. 7, since conventional automatic tracking systems adjust the scanning trace orientation so that the scanning trace is fully overlapped with the recording track, the edge of the trace being overlapped with the side edge of the recording track, a slight off-set of the scanning path in a direction for reducing the overlapping magnitude may cause substantial variation of the signal level. On the other hand, according to the shown embodiment, since the scanning trace is generally oriented substantially at the center of the recording track (FIG. 8), slight fluctuation will never affect the reproduced signal level. Therefore, according to the shown embodiment, abrupt variation of the signal level of the reproduced signal will not be caused. Accordingly, a high accuracy phase relationship adjustment can be realized.

Figure 8:
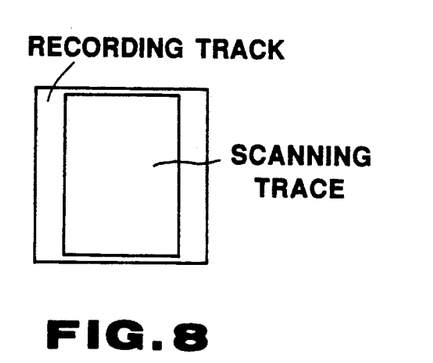
Figure 9:
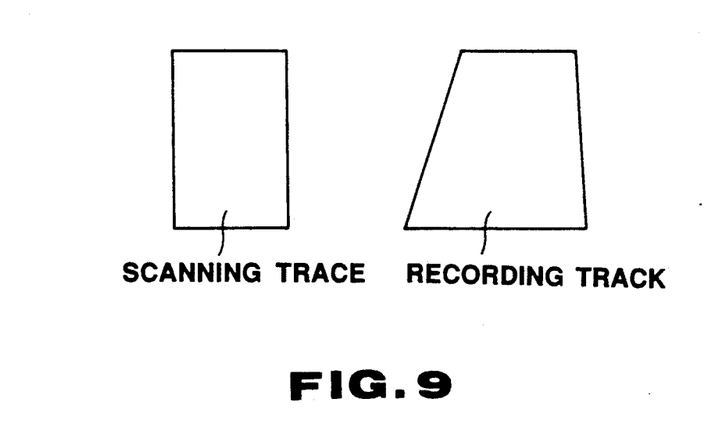
Figure 10:
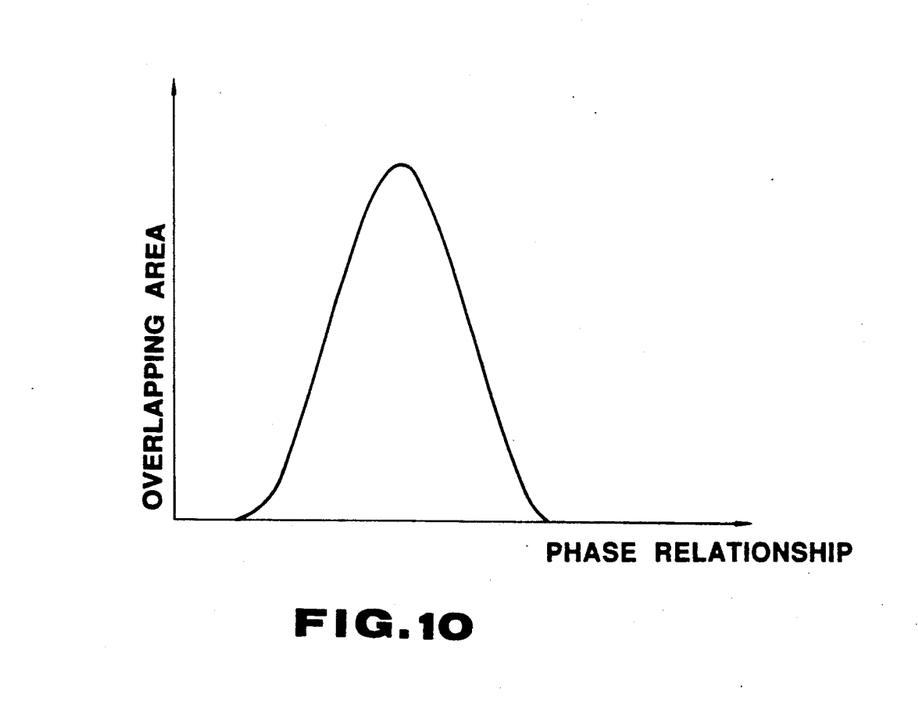
FIG. 10 is a chart showing a relationship between an overlapping area of the scanning trace and the recording track and the phase relationship between the magnetic head and the recording track.
Figure 11:
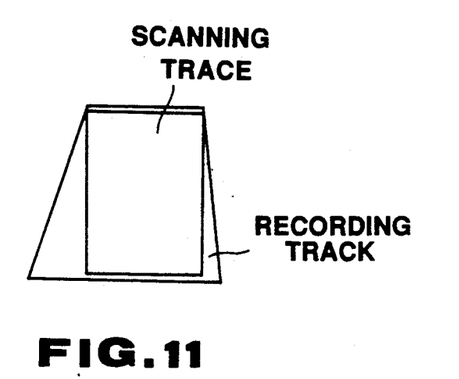
FIGS. 11, 12 and 13 are illustrations showing various overlapping relationships of the scanning trace and the recording track.

For example, if the screw or pitch angle of the scanning trace of the magnetic head is slightly varied from the screw angle of the recording track, the optimal phase relationship point can be derived according to the process set out above with respect to FIG. 8. On the other hand, when the configuration of the scanning trace of the magnetic head and the recording track do not match to each other due to meandering of the scanning trace and/or the recording track, as shown in FIG. 9, for example, variation of the phase relationship in the advancing or retarding directions becomes asymmetric with respect to the point at which the peak level of the reproduced signal is obtained. In this case, the conventional automatic tracking system adjusts the phase relationship for maximum overlapping area so that the upper edge of the scanning trace coincides with the upper edge of the recording track, which has been graphically represented as a trapezoidal shape for simplification, as shown in FIG. 11. In such case, slight a off-set of the scanning trace relative to the recording track may cause substantial and abrupt variation of the reproduced signal level.

Figure 12:
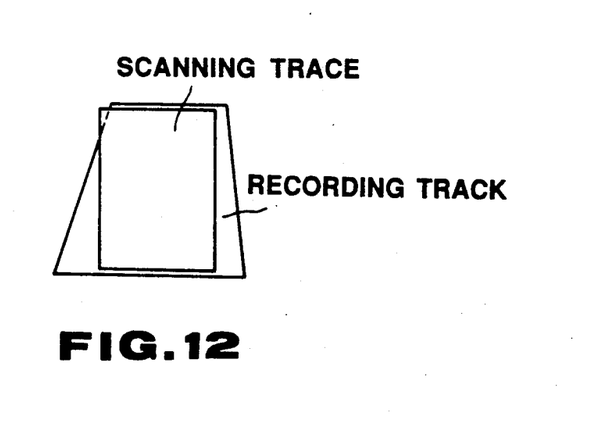

In contrast to this, according to the shown embodiment, the scanning trace is so oriented as to establish the optimal phase relationship according to the optimal phase relation point $\theta H$ as set forth above. By positioning the scanning trace at the optimal phase relation point, the orientation of the scanning trace with respect to the recording track assumes a slightly off-set position toward left from an orientation where the maximum overlapping area is obtained, as shown in FIG. 12. In this position, since the overlapping area will not cause substantial variation even when the position of the scanning trace fluctuates in relation to the recording track. Therefore, even in this case, the signal level of the reproduced signal remains stable.

Figure 13:
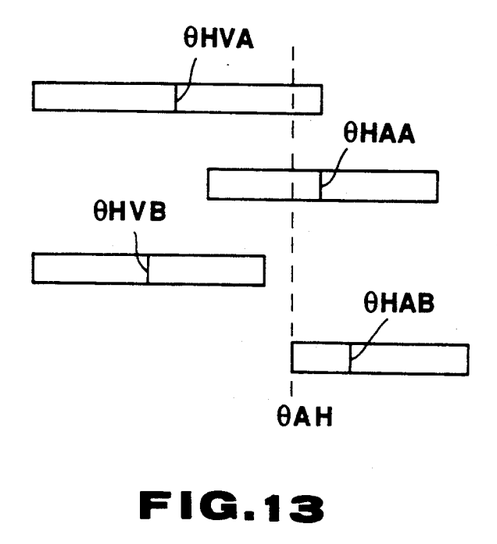

In case of Hi-Fi mode video tape, the optimal phase relationships $\theta_{HVA}$ and $\theta_{HVB}$ for the magnetic head for reproducing video signals and the optimal phase relationships $\theta_{HAA}$ and $\theta_{HAB}$ for the magnetic head for reproducing audio signals can be differentiated from each other, as shown in FIG. 13. The difference in the optimal phase relationships may represent a measure of the differences between the video tape recorder used for reproducing the recorded information and the video tape recorder used to originally record the information. Namely, when the difference is within a predetermined range, it indicates that the video and audio reproducing heads of the reproducing video tape recorder are positioned so as to substantially correspond to the position of the video tape recorder used for recording the video and audio information. In such case, the optimal phase relationship $\theta_{AH}$ may be derived through the following equation:

$$\theta_{AH} = \theta_{HVA} + \theta_{HVB} + 3 \times \{(\theta_{HAA} + \theta_{HAB})/2\}/5 \quad (4)$$

As will be appreciated from the foregoing equation, arithmetic operation is not performed for simply deriving an average value but is performed to introduce a weighting factor. As can be seen from the foregoing equation, the optimal phase relationship $\theta_{AH}$ derived from the foregoing equation (4) will have greater weight for audio signal reproduction.

On the other hand, when the difference is out of the predetermined range, it shows substantially low compatibility between the reproducing video tape recorder and the recording video tape recorder. In this case, since greater weight is given to the quality of audio reproduction, the optimal phase relationship $\theta_{AH}$ is determined so that the phase relationships $\theta_{HVA}$ and $\theta_{HVB}$ of the video reproducing head are adjusted within a range in which the phase relationships $\theta_{HAA}$ and $\theta_{HAB}$ of the audio reproduction head can be maintained within a given range.

In practice, it is not possible to avoid tolerance in arrangement of the magnetic heads. Therefore, the optimal phase relationship for one of the magnetic head is not necessarily the optimal phase relationship for the other magnetic heads. The greater the difference between the recording video tape recorder and the reproducing video tape recorder the greater the difference between the optimal phase relationships between individual magnetic heads in the reproducing video tape recorder. Therefore, according to the preferred process of determination of the optimal phase relationship, the point is determined so as to achieve the optimal balance of the phase relationships of the individual magnetic heads. By this the optimal overall phase relationship for the video tape recorder can be obtained.

In contrast to the above, the optimal phase relationship $\theta_{AH}$ in the normal mode magnetic tape reproduction can be derived according to the following equation:

$$\theta_{AH} = \frac{\theta_{HVA} + \theta_{HVB}}{2} \quad (5)$$

As can be appreciated herefrom, the preferred embodiment derives the optimal phase taking not only the difference of optimal phase relationships derived with respect to respective magnetic heads into account, but also the recording mode of the information. This assures good tracking performance.

Returning to FIG. 3, after deriving the optimal phase relationship $\theta_{AH}$ through the process set forth above, the capstan motor control signal $D_C$ is output at a step $SP_{10}$. As set forth, the capstan motor controller 13 then adjusts the capstan speed for establishing the phase relationship corresponding to the optimal phase relationship $\theta_{AH}$ as commanded by the capstan motor control signal $D_C$. After outputting the capstan motor control signal at the step $SP_{10}$, process goes EXIT at a step $SP_{11}$.

As will be appreciated herefrom, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set out in the appended claims.

What is claimed is:

1. A magnetic reproducing apparatus comprising:
    a rotary head drum assembly carrying a magnetic head for reproducing information recorded on a recording track of a magnetic recording medium;
    a drive system for feeding said magnetic recording medium over said rotary head;
    first means, associated with said drive system, for controlling a feeding speed of said magnetic recording medium for adjusting a phase relationship between said magnetic head and said recording track to a predetermined phase relationship;
    second means, cooperative with said first means, for periodically varying said predetermined phase relationship by a predetermined magnitude so that the phase relationship between said magnetic head and said recording track is sequentially shifted;
    third means for monitoring the level of a signal reproduced by said magnetic head and sampling the signal level at every occurrence of a predetermined sampling timing; and
    fourth means for processing a predetermined number of sampled signal levels for deriving a center of integration thereof for setting said predetermined phase relationship to said center of integration, said center of integration corresponding to a summation of said sampled signal levels divided by a divisor corresponding to the predetermined magnitude over which said phase is varied.

2. A magnetic reproducing apparatus as set forth in claim 1, wherein said second means is responsive to initiation of reproducing operation for causing variation of said predetermined phase relationship until said predetermined number of sampled signal levels is obtained by said fourth means.

3. A magnetic reproducing apparatus as set forth in claim 2, wherein said second means varies said predetermined phase relationship within a predetermined range defined by a maximum advance point and a maximum retard point, which maximum advance and retard points are determined at points where no substantial variation of the reproduced signal level is caused.

4. A magnetic reproducing apparatus as set forth in claim 1, wherein said rotary head drum assembly carries a plurality of magnetic heads, and said fourth means derives a said center of integration of signal levels with respect to each of said magnetic heads for deriving an optimal phase relationship with respect to corresponding magnetic heads and derives said predetermined phase relationship to be set o the basis of said optimal phase relationship derived with respect to each of said magnetic heads.

5. A magnetic reproducing apparatus as set forth in claim 4, wherein said fourth means derives said predetermined phase relationship to be set by introducing a weighting factor.

6. A magnetic reproducing apparatus as set forth in claim 1, which comprises a video tape recorder provided with a rotary head drum assembly including at least one video signal reproducing head and at least one audio signal reproducing head, and said fourth means derives said center of integration of signal levels with respect to each of said magnetic heads for deriving an optimal phase relationship with respect to corresponding magnetic heads and derives said predetermined phase relationship to be set on the basis of said optimal phase relationship derived with respect to each of said magnetic heads.

7. A magnetic reproducing apparatus as set forth in claim 6, wherein said fourth means derives said predetermined phase relationship to be set by introducing a weighting factor.

8. A magnetic reproducing apparatus a set forth in claim 7, wherein said magnetic recording medium comprises a video tape having a video recording track on which an audio signal is additionally recorded by way of deeper phase recording, and said fourth means gives a greater weighting factor to the phase relationship derived with respect to said audio signal reproducing head.

9. A magnetic reproducing apparatus as set forth in claim 1, wherein said third means checks signal level differences with adjacent sampling timings to detect the quality of sampled signal level data for rejecting sampled signal level data when said difference is greater than a predetermined threshold value.

* * * * *